Feb. 13, 1951     A. H. REEVES     2,541,099
ELECTRIC SIGNAL STORAGE OR DEMODULATING CIRCUITS
Filed March 11, 1948     2 Sheets-Sheet 1

INVENTOR
ALEC H. REEVES
BY
ATTORNEY

Patented Feb. 13, 1951

2,541,099

UNITED STATES PATENT OFFICE 2,541,099

ELECTRIC SIGNAL STORAGE OR DEMODULATING CIRCUITS

Alec Harley Reeves, London, England, assignor to International Standard Electric Corporation, New York, N. Y., a corporation of Delaware Application March 11, 1948, Serial No. 14,185
In Great Britain March 20, 1947

11 Claims. (Cl. 250—27)

The present invention relates to electric pulse translating circuit arrangements employing cold cathode gas-filled electric discharge tubes with particular, though not exclusive, application to demodulators for electric pulse communication systems.

The circuit according to the invention employs a gas discharge tube in which the electrodes of the discharge gap are so shaped that the rate of decrease of the discharge current when the discharge collapses is reduced. Tubes of this kind are described in U. S. Application No. 15,582/48 dated March 18, 1948 of A. H. Reeves.

The invention provides an electric pulse translator comprising a cold cathode gas filled electric discharge tube having a discharge gap formed by two extended electrodes which are not parallel to one another, means for applying a maintaining potential to the gap, means for applying an input pulse to produce across the gap a discharge which spreads along the electrodes and then collapses after the disappearance of the pulse, and means for deriving an output pulse from the discharge current of the gap.

The invention will be described with reference to the drawings accompanying the specification in which—

Figs. 4 and 5 show two modifications of the gas-filled tube used in the arrangement of Fig. 1.

In a multi-channel electric pulse communication system, the usual method of demodulating pulses which are signal modulated either as to amplitude, duration, or time of occurrence, is to pass the pulses of a given channel, or pulses derived from them through a low pass filter. As the pulse durations are usually very small compared with the repetition period, this method has the serious disadvantage of giving an output power very small compared with the pulse input peak power (unless a valve amplifier is used, which is often to be avoided). The circuit according to the invention gives an output power comparable with the peak input power, without hot-cathode valve amplifiers. For a 100 channel system, this may give an output power gain of up to 10,000 over the usual system.

Figure 1:
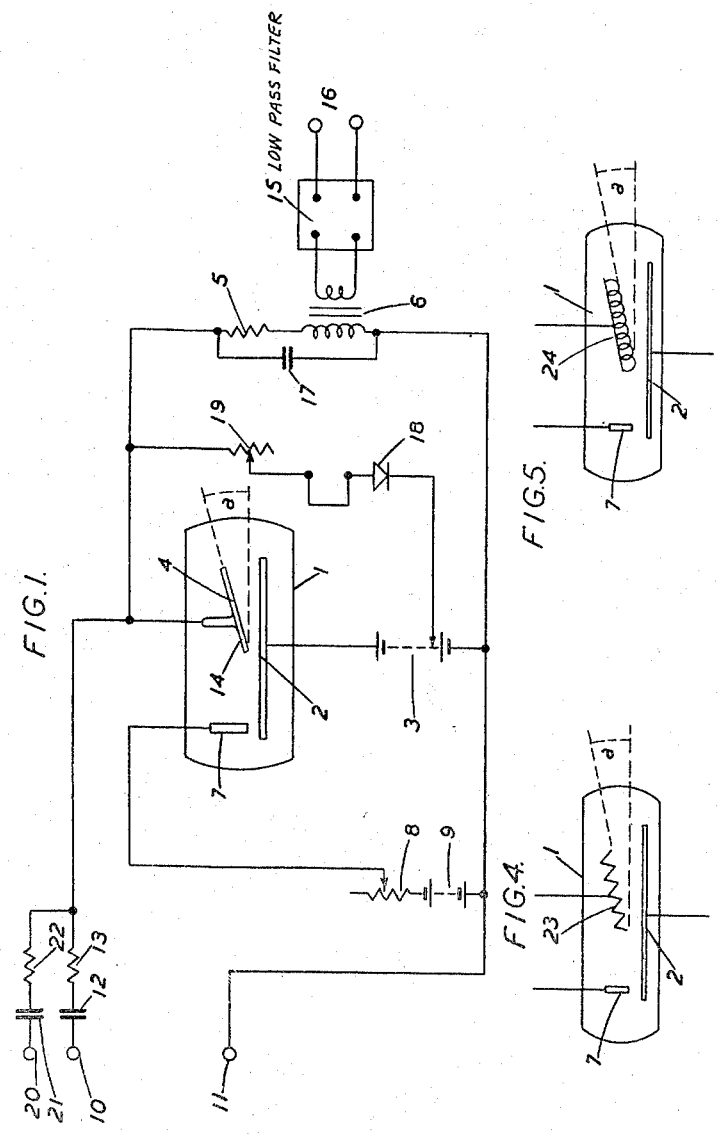
Fig. 1 shows a schematic circuit diagram of a pulse demodulating arrangement according to the invention.

A circuit according to the invention is shown in Fig. 1. It comprises a tube 1 containing a gas, or suitable mixture of gases, at a suitable pressure. 2 is an anode, which may be, for example, a rod, flat strip, or flat plate, connected to the positive terminal of battery 3. 4 is a cathode which may also be a rod, strip, or plate, connected to the negative terminal of battery 3 through resistance 5 and one winding of transformer 6. 4 is set at an angle $a$ with respect to the anode 2. 7 is an extra ionisation control cathode, at a suitable distance from 2, and connected to the negative terminal of 3 through variable resistance 8 to the negative terminal of battery 9, the positive terminal of which is connected to the negative terminal of battery 3. This auxiliary battery 9 provides an increased potential for the gap between 2 and 7 so that a permanent discharge is produced in this gap. The use of this kind of ionisation control discharge is described in U. S. Application No. 19,084/48 dated April 5, 1948 of A. H. Reeves.

The pulses to be demodulated are applied between terminals 10 and 11, through blocking condenser 12 and decoupling resistor 13, to the cathode 4 in such a sense as to make 4 more negative with respect to 2. The potential of battery 3, the nature and pressure of the gas, the nature of the electrode surfaces, and the smallest gap at end 14 between cathode 4 and anode 2, are arranged so that in the absence of pulses at 10, a glow discharge is not struck at the end 14 to the anode 2 but the pulse voltage at 10 is adjusted so that when the pulse arrives, a glow discharge does occur between 4 and 2. This discharge will first strike at end 14 of 4.

For the duration of the pulse, the ionisation will spread rapidly from the end 14 along the surface of 4 from left to right, at a speed depending chiefly on the gas constants, the sum of the pulse voltage and the voltage of battery 3, resistance 5, angle $a$, the degree of roughness of cathode surface 4, the control current between cathode 7 and 2, and the spacing between 7 and 4. These various constants are adjusted so that a modulated pulse of maximum duration or of maximum amplitude just enables the glow to spread over the whole length of cathode 4 before the pulse disappears.

If then the modulated pulse has less than this maximum value of amplitude or duration, the glow will not have had time to cover the surface of 4 completely on disappearance of this pulse; experiment and theory both show that the rate of spread is a definite quantity. Theory and experiment also show that on disappearance of the pulse the glow may be made to collapse again, and to remain only at the end 14; and furthermore, the rate of collapse may be made slower than the rate of spread during the period of the applied pulse. The collapse rate may generally be made such that for a pulse of maximum amplitude or duration the collapse is only just completed when the following pulse arrives.

Figure 2:
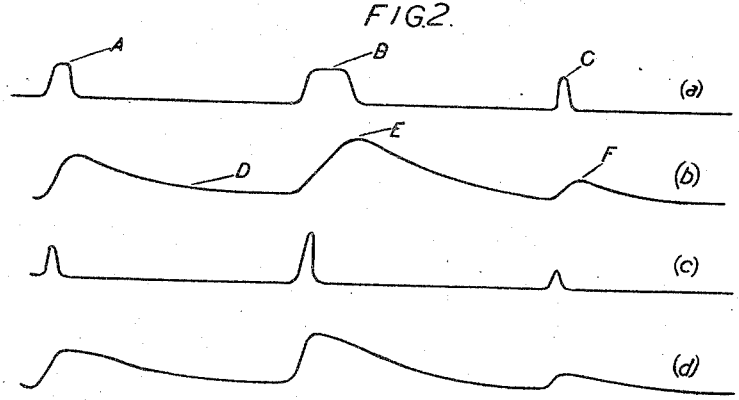
Figs. 2 and 3 show diagrams used in the explanation of the action of the arrangement shown in Fig. 1.

The process is illustrated in the curves of Fig. 2. Curve $a$ shows three successive input pulses A, B and C of different durations, and curve $b$ shows the corresponding variations of the current flowing to the cathode 4.

As shown by curve $b$ the cathode current rises rapidly from zero during the period of the pulse, and then falls slowly to a small steady value at D, continuing at the value of D till the arrival of the second pulse B of Fig. 2$a$. During the period of the second pulse the current through 4 rises again to a higher value E as the input pulse is longer. It then falls again to the value D, before the third input pulse C arrives. This third pulse causes the cathode current to rise again rapidly to a smaller value, as this third pulse is shorter than the first. The current then collapses gradually again; the rapid rise and slow collapse occur indefinitely as long as the input pulses occur.

The current from cathode 4 flows through transformer 6, of which the secondary winding is connected through a low-pass filter 15 to the output terminals 16. If 15 is arranged to pass the modulating signal frequencies but not the pulse frequencies, terminals 16 will receive the signal frequency components of the fluctuations of the total area of the curves of Fig. 2$b$. The average area may for example, correspond to an average power of the order of $\frac{1}{16}$ of the peak pulse input power. In the usual demodulation system, in the case of 100 channels, the average output power, about which signal fluctuations take place, will be only about $1/40,000$ of the peak input power. The present system thus has a relative power gain in this case of the order of 2,500.

Fig. 1 may also be used for amplitude modulated pulses. The wave forms corresponding to Fig. 2$a$ and $b$ are shown in Fig. 2$c$ and $d$. The rate of glow spread, in this case, changes with variation in the input amplitude, instead of in the duration of the spreading period.

If the angle $a$ of Fig. 1 is large, the cathode-anode distance rapidly increases as the glow moves from left to right. This reduces the rate of spreading. Increase in angle $a$, though off-set somewhat by the fact that as the glow spreads the total number of ions and electrons striking the remainder of the cathode surface is increased, also tends to reduce the rate of spread as the glow moves from left to right—thus giving a progressive limiting action, so that the cathode-current-time curve is not linear, but is less steep towards the end of the pulse duration. In some cases this limiting action is an advantage: but if a linear or other shaped curve is desired this may be achieved by giving cathode 4 a suitable shape and curvature.

For example, the above downward bending of the current-time curve may be compensated for by making the cathode 4 suitably concave with respect to the anode 2.

Another effect of increasing the angle $a$ is to augment the increase of glow collapse rate at large peak cathode currents as compared with small currents (as with large currents, the distance between cathode and anode at the initial collapse point is greater). This again tends to give a progressive limiting action. If this limiting effect is not desired, the angle $a$ should be small.

The increased voltage drop across resistor 5 and winding 6 of Fig. 1, as the cathode current increases, tends also to reduce the rate of glow spread, to make this rate less as the glow spread increases, and to make the collapse rate initially greater with large peak cathode currents. The first two effects, if undesired, may be largely compensated for by adding the small condenser 17, between cathode 4 and the negative terminal of battery 3. This condenser is arranged to be just sufficient to reduce the impedance of elements 5 and 6 together to a small quantity for the high frequency components involved during the rapid spreading period. The third effect may be compensated for, if necessary, by adding the rectifier 18 between cathode 4 and a tap on battery 3, in series with variable resistor 19 (which is zero for maximum compensation). The tap is adjusted so that current still flows in 18 when 4 is fully covered with glow. As the current through 4 is reduced the rectifier current increases, thus tending to compensate for the change in voltage drop across the load impedance 5, 6.

Another convenient way of increasing the rates of spread and collapse, is to increase the current through the auxiliary cathode 7.

Details of a suitable tube for the circuit of Fig. 1 are as follows:

Gas: 92% neon, 1% argon, 7% hydrogen at 100 m.m. pressure.
Length of cathode 4: 10 m.m.
Angle $a$: 45°
Electrode materials: pure nickel
Spacing at end 14 between 2 and 4: 5 m.m.
Rectifier 18; min. impedance: about 200 ohms (resistance 19 zero)
Current through cathode 7: 2 m.a.
Max. current through cathode 4: 4 m.a.
Spacing of cathode 7 from end 14: 10 m.m.

Figure 3:
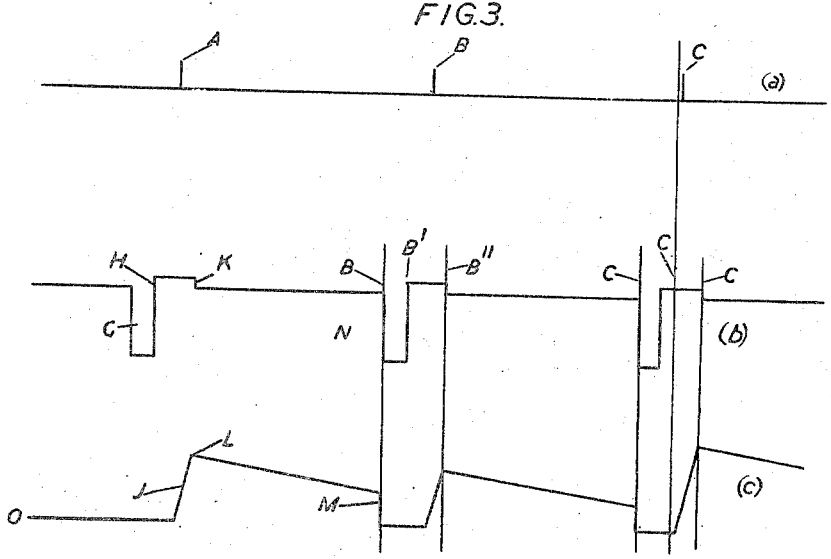

The arrangement of Fig. 1 may also be used to demodulate short time-phase modulated pulses. Let such pulses, as shown in Fig. 3$a$ be applied between 10 and 11. Let the contents be adjusted so that a discharge to cathode 4 will not strike if once out without an input pulse—and also so that when struck it will collapse slowly compared with the interval between pulses. A pulse generator (not shown) is connected to terminals 11 and 20 and applies controlling pulses of the form shown at G, Fig. 3, curve $b$, regularly repeated at the repetition frequency of the signal pulses, through a blocking condenser 21 and resistance 22 to the cathode 4. At H, just before the earliest time of occurrence of the pulse A, the controlling pulse G increases the anode-cathode voltage sufficiently to permit the pulse A applied between terminals 10 and 11 to strike a discharge at the end 14 of the cathode, and to cause the glow once struck to spread steadily along the cathode after the disappearance of the pulse A. This is shown at J in the cathode current curve, Fig. 3$c$; and spreading continues until the time K, when the trailing edge of the controlling pulse G reduces the anode-cathode voltage to the normal value. The cathode current, having reached a value of L of Fig. 3$c$, will then start to collapse slowly, reaching for example, the value M of Fig. 3$c$ at time N of Fig. 3$b$. At this time, the leading edge of the next pulse applied to terminal 20 gives a sudden large negative voltage to the anode, of a value sufficient to stop the cathode discharge altogether. The cathode current then follows a similar sequence of changes on application of the following pulses at terminal 10. Owing to the time-modulation of the pulses, the second pulse B is late as compared with pulse A, and pulse C is early. The cathode current curve, Fig. 3c, therefore rises to a lower value for pulse B and to a higher value for pulse C. The corresponding areas under the curve will then vary inversely as the time displacements of the signal pulses, so that the desired demodulation is obtained by the filter 15 (Fig. 1).

If the cathode of Fig. 1 has a smooth surface the collapse rate cannot in practice be stably reduced to a very low value. A much lower stable collapse rate may however, be obtained if the surface of cathode 4 facing the anode is made artificially rough. The glow then tends to remain in turn on each of the slight projections, also, other things being equal, the build-up rate is reduced, but this may be compensated if desired, by an adjustment of one or more of the other constants, and without increasing the collapse rate. Still lower stable collapse rates, including a zero rate, may be obtained by introducing definite and regular indentations on the cathode surface, as shown in Fig. 4 at 23.

If a large number of indentations is required, for example, for demodulating speech modulated pulses, a convenient practical construction for the cathode is a wire helix of the type generally employed in the grids of ordinary high vacuum tubes, as shown in Fig. 5 at 24. Each turn of the helix acts as one tooth of an indented surface. The glow may be prevented from spreading circularly round each turn, and may be confined to a small length opposite the anode, by coating the helix, except over a line of points opposite to the anode, with a material that has the properties of insulating and/or raising the work function. (An example is the use of alumina, which does both, and is easily applied).

Either of the types of tube shown in Figs. 4 and 5 may be used for demodulation of pulses with a very low recurrence rate—or, alternatively for the storage for an indefinite period of information concerning single pulses. This latter facility may be very useful for example, in telephone message registers, or in computing machines. It is clear that for indefinitely long storage time the collapse rate must be zero, and a local quench pulse such as that shown by Fig. 3b must be used: it is also clear that this latter arrangement may be used for amplitude or duration modulated pulses as well as for time-phase modulated pulses.

I claim:

1. An electric pulse translator comprising a cold cathode gas filled electric discharge tube having a discharge gap formed by two extended electrodes forming an angle with one another, means for applying a maintaining potential to the gap, means for applying an input pulse to produce across the gap a discharge which spreads along the electrodes and then collapses after the disappearance of the pulse, and means for deriving an output pulse from the discharge circuit of the gap.

2. A translator according to claim 1 in which one of the electrodes is provided with an irregular surface.

3. An electric pulse integrator comprising a translator according to claim 1, means for applying a train of input pulses to initiate a series of discharges across the gap, and means for integrating the train of corresponding output pulses.

4. An integrator according to claim 3 in which the integrating means comprises a low pass filter.

5. A demodulator for a train of weight modulated electric pulses comprising a cold cathode gas filled electric discharge tube having two straight electrodes set at an angle to one another to form a discharge gap, a source of maintaining potential connected to the said electrodes, means for applying the pulses of the train to the electrodes in such manner that each of the pulses produces a discharge which spreads along the electrodes to an extent depending on the pulse weight, and then collapses after the disappearance of the pulse, means for deriving output pulses from the gap discharge currents, and means for integrating the output pulses.

6. A demodulator for a train of phase modulated electric pulses having a given repetition frequency comprising a cold cathode gas filled electric discharge tube having two straight electrodes set at an angle to one another to form a discharge gap, a source of maintaining potential connected to the said electrodes which is insufficient to initiate a discharge, means for applying the phase modulated pulses to said gap to fire the discharge gap, a source of a train of controlling pulses having a given repetition frequency connected to the discharge gap, each controlling pulse being adapted first to extinguish any existing discharge and then to condition the gap for a specified period so that a discharge is produced by a phase modulated pulse arriving during the specified period, the said discharge spreading along the electrodes to an extent depending on the timing of the phase modulated pulse, and then collapsing after the disappearance of the controlling pulse, means for deriving output pulses from the gap discharge currents, and means for integrating the output pulses.

7. A demodulator according to claim 6 in which each controlling pulse is applied to the cathode electrode and comprises a negative portion followed by a positive portion.

8. A demodulator according to claim 5, in which the modulated pulses are applied in negative sense to the cathode electrode.

9. A demodulator according to claim 5 in which the output pulses are derived from a transformer connected in series with the source of maintaining potential.

10. A demodulator according to claim 5 in which the integrating means comprises a low pass filter.

11. A demodulator according to claim 5 in which one of the electrodes is provided with an irregular surface.

ALEC HARLEY REEVES.

REFERENCES CITED

The following references are of record in the file of this patent:

UNITED STATES PATENTS

| Number | Name | Date |
| --- | --- | --- |
| 2,220,556 | Thorson | Nov. 5, 1940 |
| 2,220,839 | Hahn | Nov. 5, 1940 |